Patented June 8, 1954

2,680,750

UNITED STATES PATENT OFFICE 2,680,750

PREPARATION OF CYCLIC ANHYDRIDES AND IMIDES OF AROMATIC DICARBOXYLIC ACIDS

William W. Prichard, Wilmington, Del., assignor to E. I. du Pont de Nemours and Company, Wilmington, Del., a corporation of Delaware No Drawing. Application September 25, 1951, Serial No. 248,273

8 Claims. (Cl. 260—346.7)

This invention relates to a process of preparing cyclic anhydrides and imides of aromatic dicarboxylic acids.

Aromatic dicarboxylic acid anhydrides are usually prepared by heating the free acid, alone or with a strong dehydrating agent such as phosphoric anhydride or acetyl chloride. Under such drastic conditions the yields are often low, particularly when substituents are present on the aromatic nucleus. Then, too, substituted aromatic dicarboxylic acids are not generally readily available. Phthalic anhydride is conveniently prepared by vapor oxidation of naphthalene but this method is not a general one. The imides of aromatic dicarboxylic acids are in turn made from the anhydrides by action of ammonia.

An object of this invention is to provide a new process of preparing cyclic anhydrides and imides of aromatic dicarboxylic acids. A further object is to provide such a process whereby these compounds may be made in satisfactory yields and under relatively mild conditions. Other objects will be apparent from the description of the invention given hereinafter.

The above objects are accomplished according to the present invention by heating under substantially anhydrous conditions at a temperature of at least 250° C. an open-chain aromatic compound of the formula R—CO—X—CO—R″ where R and R″ are aromatic radicals and X is oxygen or the imido, >NR′, group where R′ is hydrogen or an alkyl or aryl radical, in the presence of nickel carbonyl as a catalyst. Obviously, the nature of this reaction is such that it requires substantially anhydrous conditions.

In a more specific form, the process of this invention comprises heating, preferably in an inert organic solvent, under substantially anhydrous conditions at a temperature of 250° C.–450° C., an open-chain aromatic compound as above in the presence of nickel carbonyl as a catalyst and under a carbon monoxide pressure of 10 to 1000 atmospheres.

It has been discovered that heating the open-chain aromatic compounds herein considered under the conditions stated above results in a cyclization reaction, or rearrangement, taking place whereby one of the bonds between a carbonyl and a carbon atom of an aromatic ring opens and the carbonyl group attaches itself to the second aromatic ring, its place on the first ring being taken by a hydrogen atom of the second ring. The reaction may be represented by the following equation, using benzoic anhydride as the illustrative reactant to form phthalic anhydride and benzene:

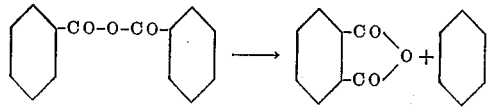

Nickel carbonyl, Ni(CO)$_4$, is a specific catalyst for this rearrangement. It can be introduced in the reaction mixture as preformed nickel carbonyl, or it can be formed in situ from metallic nickel and carbon monoxide at the reaction temperature. The nickel carbonyl need be used only in small amounts, e. g., in amounts between 0.5% and 10% of metallic nickel based on the weight of the aromatic carboxylic acid anhydride or imide, although much more can be used if desired, e. g., up to 25% by weight or even more. The reaction will proceed in the presence of nickel carbonyl alone, that is, without added carbon monoxide, as shown in Example VIII below. However, better results are obtained when the reaction is carried out under an added pressure of carbon monoxide, which may be, for example, between 10 and 1000 atmospheres at the operating temperature, and preferably between 100 and 500 atmospheres.

The reaction proceeds slowly at temperatures below about 250° C. and it is therefore preferred to operate above that temperature. The temperature can be as high as the decomposition point of the reactants, but practically it need not be higher than about 450° C., a generally useful range being 250–375° C.

A solvent or diluent medium is not essential, but it is helpful to promote better contact between reactant and catalyst. Any inert organic solvent stable under the reaction conditions can be used, the preferred ones being the saturated aliphatic or alicyclic hydrocarbons such as n-hexane, kerosene, cyclohexane, and the like, and particularly the aromatic hydrocarbons such as benzene, toluene, the xylenes, naphthalene, and the like. As already noted, an aromatic compound having the nucleus of the starting aromatic acid anhydride or imide is formed during the reaction. The amount of solvent in relation to reactant and catalyst is largely immaterial as long as there is sufficient solvent to provide good contact. For practical and economical reasons, there is usually employed from 1 to 20 parts of solvent or diluent per part of aromatic acid anhydride or imide.

At the preferred temperature the reaction is quite rapid and sometimes vigorously exothermic.

It is probably substantially completed almost instantaneously but the heating period may be continued for a few hours if desired. The reaction product may be isolated by any desired method. In general, the metallic nickel, if any is present at the end of the reaction, is filtered off, the solvent or diluent and recovered nickel carbonyl are removed by distillation, and the cyclic acid anhydride or imide is separated from unreacted starting material and by-products by fractionation or crystallization.

The following examples in which parts are by weight unless otherwise stated illustrate specific embodiments of the invention.

*Example I*

A silver-lined pressure vessel was charged with 25 parts of benzoic anhydride, 100 parts of toluene, and 5 parts of nickel carbonyl. The vessel was closed, pressured with carbon monoxide to a pressure of 100 atmospheres and heated with agitation for 2 hours at 325° C. The vessel was then cooled, vented, and the reaction product (115.4 parts) was discharged. The low boiling material was distilled off at atmospheric pressure, giving 98.5 parts of distillate which, on refractionation, gave 3 parts of recovered nickel carbonyl, 3.4 parts of benzene, and 91 parts of toluene. The higher boiling reaction product was distilled under reduced pressure, giving 11.5 parts of a solid material and 3.6 parts of non-volatile residue. The solid distillate was washed with a small amount of cold diethyl ether. The insoluble portion (10.1 parts) was phthalic anhydride, identified by its melting point of 128–130° C. and by mixed melting point, which was thus obtained in 61.8% conversion.

*Example II*

A silver-lined pressure vessel was charged with 15 parts of benzoic anhydride, 75 parts of toluene, and 5 parts of a 20% nickel-on-carbon catalyst prepared by reduction of the oxide. The vessel was sealed, pressured with carbon monoxide to 100 atmospheres pressure, and heated with agitation at 275° C. for 2 hours. The reaction product (92 parts) was heated at 142° C. at atmosphere pressure, finishing at 20 mm. pressure, to remove the low boiling material. This gave 77 parts of low boiling liquid. The pressure was then lowered to 0.1 mm. and 9.08 parts of phthalic anhydride, M. P. 129–131° C., was distilled.

The above was repeated with the only change that no carbon monoxide was pressured into the reaction vessel. Distillation of the reaction product showed it to contain 1.3 parts of benzoic acid, but no phthalic anhydride was isolated. This demonstrated that the presence of nickel carbonyl is necessary for the rearrangement of benzoic anhydride to phthalic anhydride.

*Example III*

A silver-lined pressure vessel was charged with 8 parts of dibenzoylaniline, $$C_6H_5-CO-N-CO-C_6H_5$$
$$|$$
$$C_6H_5$$

100 parts of toluene, and 5 parts of nickel carbonyl. The vessel was sealed, pressured with carbon monoxide to 100 atmospheres pressure, and heated with agitation at 325° C. for 2 hours. The reaction product weighed 103.1 parts. After removal of the solvent, 3.6 parts of solid material was distilled. This was N-phenylphthalimide, which melted at 203° C. after recrystallization from a chloroform-methanol mixture.

*Example IV*

A silver-lined pressure vessel was charged with 20 parts of ortho-toluic anhydride, 2 parts of nickel carbonyl, and 80 parts of xylene. The vessel was heated at 326° C. for 2 hours under carbon monoxide pressure and there was recovered 94 parts of reaction product. Distillation gave 78.3 parts of low boiling material, then 8.4 parts of a solid distilling at 142° C. at 0.2 mm. pressure, and, finally, 2.3 parts of a liquid boiling at 186° C. at 0.2 mm. pressure. The solid distillate, which melted at 108–110° C., was identified as 3-methyl phthalic anhydride by hydrolysis to 3-methyl phthalic acid, M. P. 154–5° C. This represents a 68.4% conversion. The highest boiling fraction was unreacted orthotoluic anhydride, and the yield of the 3-methyl phthalic anhydride was therefore 77.4%.

*Example V*

A silver-lined pressure vessel was charged with 9 parts of alpha-naphthoic anhydride, 100 parts of benzene, and 5 parts of nickel carbonyl, and pressured with carbon monoxide at 100 atmospheres pressure. The vessel was heated for 2 hours at 275° C. with agitation. The benzene was removed from the reaction product, after which 2.5 parts of naphthalene distilled at 142° C. at 1 mm. pressure. A very high boiling solid was then distilled by heating the distillation vessel to 255° C. at 0.2 mm. pressure. This distillate, which weighed 3.5 parts, was extracted with hot methanol to remove some unreacted naphthoic anhydride. The insoluble residue was recrystallized from chloroform to give needles melting at 274–276° C. This material was identified as the anhydride of 1,8-dicarboxynaphthalene by its melting point and by hydrolysis to 1,8-dicarboxynaphthalene.

*Example VI*

A silver-lined pressure vessel was charged with 43 parts of para-methoxybenzoic anhydride, 80 parts of benzene, and 5 parts of nickel carbonyl. The vessel was pressured with carbon monoxide to 100 atmospheres pressure and heated to 325° C. for 2 hours with agitation. The reaction product was freed of benzene by heating at reduced pressure, the anisole which had formed was removed at 67° C. at 13 mm. pressure, and there was obtained 23 parts (86% conversion) of 4-methoxy phthalic anhydride distilling at 250° C. at 13 mm. pressure. This material was identified by its melting point of 94–95° C. and by hydrolysis to 4-methoxy phthalic acid, M. P. 171–2° C.

*Example VII*

It is known that dibenzamide $$C_6H_5CONHCOC_6H_5$$

is formed by heating together benzoic acid and benzonitrile at temperatures above 250° C. (Colby and Dodge, American Chemical Journal 13, 1, 10). In this example, dibenzamide was formed in situ and rearranged to phthalimide. A silver-lined pressure vessel was charged with equimolar amounts of benzoic acid (24.4 parts) and benzonitrile (20.6 parts), 100 parts of benzene, and 5 parts of nickel carbonyl. The vessel was pressured with carbon monoxide and heated at 325° C. for 2 hours with agitation. There were recovered 137.3 parts of reaction product. On cooling, 5 parts of phthalimide crystallized out, which was identified by its melting point of 233–234° C. after recrystallization from methanol, and further identified by hydrolysis in alkaline solution which caused evolution of ammonia and formation of ortho-phthalic acid.

*Example VIII*

A silver-lined pressure vessel was charged with 20 parts of benzoic anhydride, 3 parts of nickel carbonyl, and 100 parts of toluene. Fifty parts of carbon dioxide was distilled into the vessel, which was then heated at 275° C. for 2 hours. Distillation of the reaction products gave, besides toluene, 1.2 parts of phthalic anhydride and 9 parts of unreacted benzoic anhydride. This demonstrates that the presence of carbon monoxide is unnecessary for the rearrangement reaction of this invention to take place.

It will be understood that the above examples are merely illustrative and that the invention broadly comprises a process of preparing cyclic anhydrides and imides of aromatic dicarboxylic acids of the formula

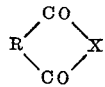

from open-chain aromatic compounds of the formula R—CO—X—CO—R" where the R's are aromatic radicals and X is oxygen or the imido, >NR', group where R' is hydrogen, alkyl or aryl, by heating the open-chain aromatic compounds at a temperature of at least about 250° C. in the presence of nickel carbonyl as a catalyst. Substantially anhydrous conditions are required to carry out this reaction satisfactorily.

This invention is generally applicable to open-chain aromatic compounds of the formula R—CO—X—CO—R", R and R" having the significance as above. The carbonyl groups are directly attached to annular carbon atoms of the aromatic radicals. The radicals R and R" can be the same or different, i. e., a mixed acid anhydride or imide can be used provided that both of the radicals R are aromatic. When such a "mixed" starting material is used, the reaction product consists of a mixture of the two cyclic anhydrides or imides corresponding to each of the aromatic radicals present in the starting material.

The process of this invention is applicable, for example, to open-chain aromatic acid anhydrides or imides in which the aromatic radicals are aryl groups of 1 to 3 six-membered nuclei, e. g., phenyl, naphthyl, anthryl or phenanthryl, including such aryl groups bearing such substituents as alkyl, aryl, alkoxy, aryloxy, carbalkoxy, cyano, aldehydro groups and the like. Obviously, it is undesirable to use starting materials containing substituents reactive either with acid anhydrides or imides or with carbon monoxide under the reaction conditions, since side reactions would seriously decrease the yield of desired product in such instances. In general, these undesirable substituents are those which evolve gas in the well-known Zerewitinoff test for active hydrogen, that is, those groups which contain an active hydrogen, namely, a hydrogen linked to an oxygen, nitrogen, or sulfur atom, and the nitro, nitroso, and azo groups. Likewise, it is obviously necessary that one of the ring carbons adjacent to the carbonyl-bearing ring carbon be unsubstituted, in order to permit the formation of a phthalic anhydride-type compound.

Additional specific examples of suitable starting materials are the anhydrides and imides of 2-ethylbenzoic acid, 4-n-hexylbenzoic acid, 4-phenylbenzoic acid, 2,3-dimethylbenzoic acid, 2,4,5-trimethylbenzoic acid, 2-benzylbenzoic acid, indenecarboxylic acid, 2-butylnaphthoic acid, beta-naphthoic acid, 1-anthrylcarboxylic acid, 4-ethoxybenzoic acid, 4-phenoxybenzoic acid, 2-carbethoxybenzoic acid, 4-cyanobenzoic acid, and the like. Mixed anhydrides or imides suitable for use include, for example, those of benzoic and o-toluic acid, of benzoic and alpha-naphthoic acid, of 2,3-dimethylbenzoic acid and p-toluic acid, etc. As already noted, the imides may be substituted on the imido nitrogen, the substituents being preferably alkyl or aryl groups of 1 to 6 carbon atoms, e. g., methyl, n-butyl, n-hexyl or phenyl groups. The preferred starting materials are the acid anhydrides R—CO—O—CO—R" where the R's are aryl of 1 to 3 six-membered nuclei, including such aryl groups substituted by alkyl radicals of 1 to 6 carbon atoms or phenyl, or by alkoxy radicals of 1 to 2 carbon atoms, and the corresponding imides, wherein the imido group is unsubstituted or substituted by alkyl radicals of 1 to 6 carbon atoms or phenyl.

This invention provides a simple and effective method of preparing cyclic anhydrides or imides of aromatic dicarboxylic acids. As is known, these products are of considerable technical importance as intermediates in the synthesis of many industrial products such as resins of the glyptal type, dyes, pharmaceuticals, and the like.

As many apparently widely different embodiments of this invention may be made without departing from the spirit and scope thereof, it is to be understood that the invention is not limited to the specific embodiments thereof except as defined in the appended claims.

The invention claimed is:

1. Process of preparing cyclic anhydrides and imides of aromatic dicarboxylic acids which comprises heating under substantially anhydrous conditions at a temperature of at least about 250° C. an open-chain aromatic compound of the formula R-CO-X-CO-R" where R and R" are carbocyclic aromatic radicals of 1 to 3 six-membered nuclei and X is selected from the group consisting of oxygen and the imido, >NR', group, R' being selected from the group consisting of hydrogen and alkyl and aryl radicals, said aromatic compound being free from functional groups which evolve gas in the Zerewitinoff test for active hydrogen, and having an unsubstituted annular carbon adjacent to the carbonyl-bearing annular carbon of one of said aromatic radicals R and R", in the presence of nickel carbonyl as a catalyst.

2. A process as set forth in claim 1 wherein said heating is carried out under a carbon monoxide pressure of 10 to 1000 atmospheres.

3. Process as set forth in claim 2 wherein said heating is carried out at a temperature of 250° C.–375° C.

4. Process of preparing cyclic anhydrides and imides of aromatic dicarboxylic acids which comprises heating under substantially anhydrous conditions in an inert organic solvent at a temperature of 250° C.–375° C. an open-chain aromatic compound of the formula R-CO-X-CO-R" where R and R" are carbocyclic aromatic radicals of 1 to 3 six-member nuclei and X is selected from the group consisting of oxygen and the imido, >NR' group, R' being selected from the group consisting of hydrogen and alkyl and aryl radicals, said aromatic compound being free from functional groups which evolve gas in the Zerewitinoff test for active hydrogen, and having an unsubstituted annular carbon adjacent to the carbonyl-bearing annular carbon of one of said aromatic radicals R and R'', in the presence of nickel carbonyl as a catalyst and under a carbon monoxide pressure of 100 to 500 atmospheres.

5. Process of preparing cyclic anhydrides of aromatic dicarboxylic acids which comprises heating under substantially anhydrous conditions at a temperature of at least about 250° C. an open-chain aromatic acid anhydride of the formula R-CO-O-CO-R'' where R and R'' are carbocyclic aromatic radicals of 1 to 3 six-membered nuclei, said aromatic compound being free from functional groups which evolve gas in the Zerewitinoff test for active hydrogen, and having an unsubstituted annular carbon adjacent to the carbonyl-bearing annular carbon of one of said aromatic radicals R and R'', in the presence of nickel carbonyl as a catalyst and under a carbon monoxide pressure of 10 to 1000 atmospheres.

6. Process of preparing cyclic anhydrides of aromatic dicarboxylic acids which comprises heating under substantially anhydrous conditions in an inert organic solvent at a temperature of 250° C.–375° C. an open-chain aromatic acid anhydride of the formula R-CO-O-CO-R'' where R and R'' are carbocyclic aromatic radicals of 1 to 3 six-membered nuclei, said aromatic compound being free from functional groups which evolve gas in the Zerewitinoff test for active hydrogen, and having an unsubstituted annular carbon adjacent to the carbonyl-bearing annular carbon of one of said aromatic radicals R and R'', in the presence of nickel carbonyl under a carbon monoxide pressure of 100 to 500 atmospheres.

7. Process of preparing phthalic anhydride which comprises heating under substantially anhydrous conditions at a temperature of at least about 250° C. benzoic anhydride in the presence of nickel carbonyl as a catalyst and under a carbon monoxide pressure of 10 to 1000 atmospheres.

8. Process of preparing phthalic anhydride which comprises heating under substantially anhydrous conditions in an inert organic solvent at a temperature of 250° C.–375° C. benzoic anhydride in the presence of nickel carbonyl as a catalyst and under a carbon monoxide pressure of 100 to 500 atmospheres.

No references cited.